(12) United States Patent
Zhang et al.

(10) Patent No.: US 12,301,621 B2
(45) Date of Patent: May 13, 2025

(54) INLINE MALICIOUS URL DETECTION WITH HIERARCHICAL STRUCTURE PATTERNS

(71) Applicant: Palo Alto Networks, Inc., Santa Clara, CA (US)

(72) Inventors: Yubao Zhang, Palo Alto, CA (US); Fang Liu, Lubbock, TX (US); Peng Peng, Santa Clara, CA (US); Oleksii Starov, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 218 days.

(21) Appl. No.: 17/938,482

(22) Filed: Oct. 6, 2022

(65) Prior Publication Data
US 2024/0121267 A1 Apr. 11, 2024

(51) Int. Cl.
*H04L 9/40* (2022.01)

(52) U.S. Cl.
CPC ...... *H04L 63/1483* (2013.01); *H04L 63/0263* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 8,776,240 B1* | 7/2014 | Wu | G06F 21/567 726/25 |
| 9,178,901 B2 | 11/2015 | Xue et al. | |
| 9,251,282 B2* | 2/2016 | Loder | G06F 16/9566 |
| 9,330,258 B1 | 5/2016 | Satish et al. | |
| 10,057,279 B1* | 8/2018 | Balduzzi | H04L 63/145 |
| 10,218,716 B2 | 2/2019 | Huang et al. | |
| 10,778,702 B1* | 9/2020 | Huang | H04L 63/0236 |
| 2016/0065613 A1* | 3/2016 | Cho | H04L 63/1416 726/23 |
| 2016/0127402 A1* | 5/2016 | Veeramachaneni | H04L 63/20 726/23 |
| 2022/0272125 A1* | 8/2022 | Tora | G06N 20/00 |

\* cited by examiner

*Primary Examiner* — Raqiul A Choudhury
(74) *Attorney, Agent, or Firm* — Gilliam IP PLLC

(57) ABSTRACT

A hierarchical structure constructor constructs a hierarchical structure that comprises nodes associated with feature sets patterns of URLs. Nodes at each depth are labelled as malicious, benign, or mixed for corresponding to URLs that are malicious, benign, or malicious and benign that match the corresponding patterns. Malicious feature set patterns are extracted from malicious nodes in the hierarchical structure. A URL analyzer operates inline by logging traffic sessions, extracting URLs from the logs, and matching the extracted URLs with the malicious feature sets patterns extracted from the hierarchical structure. The hierarchical structure is periodically updated with known malicious/ benign URLs to improve quality of malicious URL detection.

20 Claims, 9 Drawing Sheets

INLINE MALICIOUS URL DETECTION WITH HIERARCHICAL STRUCTURE PATTERNS

BACKGROUND

The disclosure generally relates to electric digital data processing (e.g., CPC G06F) and to security arrangements for protecting computers, components thereof, programs or data against unauthorized activity (e.g., G06F 11/1004).

Uniform Resource Locators (URLs) comprise components corresponding to different fields in the URL. Each component is separated according to standardized syntax. For instance, the Uniform Resource Identifier (URI) Request for Comments (RFC) 3986 standard—which includes URLs—provides the following syntax: scheme ":" hier-part ["?" query] ["#" fragment] comprising a scheme component, a hier-part component, a query component, and a fragment component. The hier-part component is a hierarchical component with a top level in the hierarchy corresponding to a domain name component for URLs and subsequent levels in the hierarchy corresponding to a URL path component.

BRIEF DESCRIPTION OF THE DRAWINGS

Embodiments of the disclosure may be better understood by referencing the accompanying drawings.

DESCRIPTION

Figure 1:
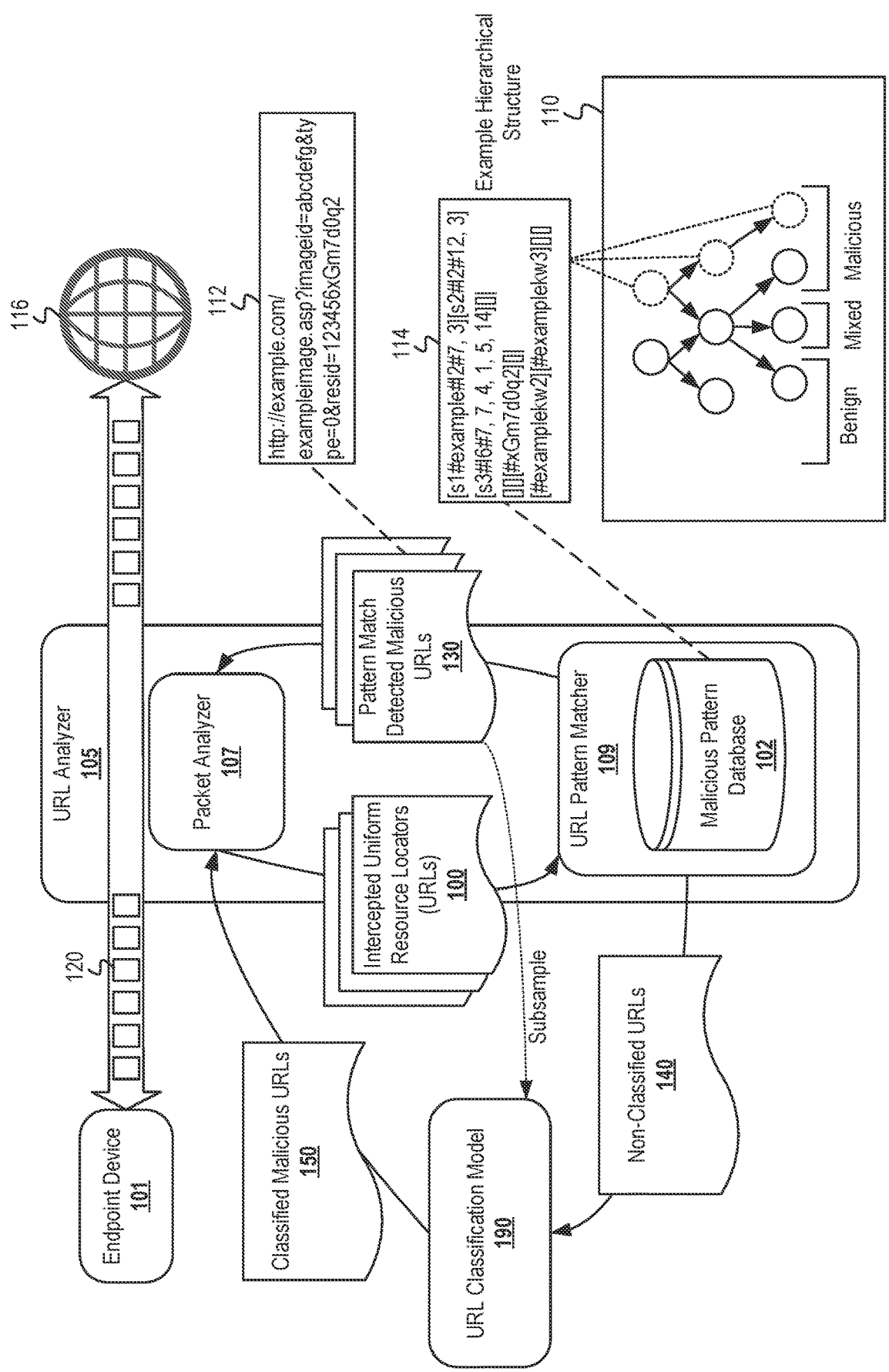
FIG. 1 is a schematic diagram of an example system for inline detection of malicious URLs with patterns generated according to a hierarchical structure.

The description that follows includes example systems, methods, techniques, and program flows to aid in understanding the disclosure and not to limit claim scope. Well-known instruction instances, protocols, structures, and techniques have not been shown in detail for conciseness.

Overview

Inline malicious URL detection is vastly improved with inline pattern detection using patterns for URLs corresponding to new and/or adaptive malicious attackers. Generating patterns for these previously unobserved malicious attacks such as zero-day exploits can stifle attacks inline as traffic is received and prevent further attack stages. Accuracy of such patterns is thus beneficial for accurately detecting malicious attacks with low false negative rates. A hierarchical structure constructor disclosed herein combines URL patterns in a hierarchical structure wherein nodes in the hierarchical structure improve certainty of classifying malicious/benign URLs successively at each depth using patterns encoded at the nodes. Each node in the hierarchical structure is associated with values for a URL feature set at the corresponding depth that represent part of a pattern for one or more corresponding URLs. At a first depth below the root depth, the hierarchical structure constructor determines values for a broad scoped URL feature set that are likely to delineate URLs as malicious or benign. At successive depths, the hierarchical structure constructor determines successively more granular feature sets are likely to delineate URLs with higher precision. Thus, the patterns become successively more descriptive at each depth which improves pattern accuracy for malicious attack detection.

During hierarchical structure construction, known malicious and benign URLs are periodically collected. The hierarchical structure constructor then proceeds to determine values for a URL feature set at the root depth and iteratively through URL feature sets at the remaining depths. At each depth, each pattern of values of the corresponding URL feature set is associated with a node. Each node is labelled/indicated as malicious, benign, or mixed. A malicious node indicates that the corresponding URL(s) is malicious, a benign node indicates that the corresponding URL(s) is benign, and a mixed node indicates that the pattern of feature set values is common among at least one benign URL and at least one malicious URL. Each node is associated with values of a URL feature set of the corresponding depth and values of the URL feature set(s) of each previous depth in the hierarchical structure. Thus, leaf nodes are associated with patterns that comprise values of URL feature sets across depths in the hierarchical structure. A malicious pattern extractor extracts patterns of values of feature sets associated with malicious leaf nodes ("malicious feature sets patterns" or "malicious patterns") from the constructed hierarchical structure. A URL analyzer can use the extracted malicious patterns to detect malicious URLs in network traffic.

Example Illustrations

FIG. 1 is a schematic diagram of an example system for inline detection of malicious URLs with patterns generated according to a hierarchical structure. A URL analyzer 105 comprises a packet analyzer 107 that analyzes packets 120 inline. The packets 120 form at least part of network traffic communicated between an endpoint device 101 and the Internet 116. A URL pattern matcher 109 receives intercepted URLs 100 from the packets 120 and compares them against patterns in a malicious pattern database 102 to determine malicious URLs 130. The URL pattern matcher 109 then communicates malicious URLs 130 to the packet analyzer 107 for corrective action.

The packet analyzer 107 can be any type of packet analyzer configured to intercept and log traffic communicated between the endpoint device 101 and the Internet 116. For instance, the packet analyzer 107 can be third party software managed through a packet capture (PCAP) application programming interface (API) and logs of intercepted traffic can be stored as .pcap files. The packet analyzer 107 can be configured to only intercept traffic with certain attributes, for instance with specified source and destination Internet Protocol (IP) addresses, source, and destination ports, etc. The packet analyzer 107 can log URLs in the packets 120 and can discard other data in the logs. Alternatively, the packet analyzer 107 can communicate entire logs or subsets of logs to a separate firewall component after URL extraction for further detection of potentially malicious behavior. The packet analyzer 107 communicates intercepted URLs 100 indicated in logs of the packets 120 to the URL pattern matcher 109.

The URL pattern matcher 109 analyzes the intercepted URLs 100 against patterns in the malicious pattern database 102. Analysis of the intercepted URLs 100 involves the URL pattern matcher 109 generating, for each of the intercepted URLs 100, a pattern of values of feature sets from the URL. The URL pattern matcher 109 generates values from a URL for each of multiple feature sets and assembles the values into a pattern—a "feature sets pattern". The patterns in the malicious pattern database 102 can be stored as strings. As such, an implementation of the URL pattern matcher 109 comprises a pattern matching component that receives malicious patterns stored in the malicious pattern database 102 and implements a string-matching algorithm with the feature sets patterns of the URLs 100 against the received malicious patterns to determine whether any of the patterns are matched. The patterns of the URLs 100 matched with malicious patterns are indicated as malicious and the malicious URLs 130 are communicated to the packet analyzer 107. While the description refers to the group of URLs 100, the classification of a URL as malicious and communication of that verdict is individual. Although, classification and communication of multiple URLs can be in parallel.

An example pattern 114 stored in the malicious pattern database 102 is the following:
 [s1 #example #12 #7, 3][s2 #12 #12, 3][s3 #16 #7, 7, 4, 1, 5, 14][ ]|
 [ ] [ ][#xGm7d0q2][ ]|
 [#examplekw2][#examplekw3][ ][ ]

The example pattern 114 corresponds to a node at a leaf of a branch in an example hierarchical structure 110 indicated by dotted circles that is classified as malicious. In this example, each vertical line in the example pattern 114 represents a distinct depth of the example hierarchical structure 110 with feature sets patterns at each depth delineated with "|" notation. If a URL feature set is absent or not relevant for a URL component, then empty brackets are inserted for that feature set. For instance, a URL component may not contain an embedded domain, an email, a file extension, a keyword from a database of malicious keywords etc. The example pattern 114 is stored at the bottom/leaf depth of the example hierarchical structure 110.

The feature sets for the example pattern 114 are the following, at corresponding indicated depths:
 Depth 1: alphabet statistics, TLD, lengths
 Depth 2: percent encodings, gibberish, email addresses, file extensions, embedded domains
 Depth 3: malicious keywords At the first depth in the example pattern 114, the feature set comprises the alphabet statistics feature, TLD feature, and length feature. The values for these features of the first depth feature set are the following:
 [s1 #example #12 #7, 3][s2 #12 #12, 3][s3 #16 #7, 7, 4, 1, 5, 14][ ]

This pattern at the first depth indicates alphabet statistics s1 (a variable placeholder for an alphabet statistics feature), TLD "example", and lengths 7 and 3 for the domain name component, alphabet statistics s2, no TLD value, and lengths 12 and 3 for the path or sub-directory component, and alphabet statistics s3, no TLD value, and lengths 7, 7, 4, 1, 5, and 14 for the query component. The length feature is represented as a vector that denotes the length of each substring in the URL components separated by special characters such as "=", ".", and "&" and the vector is prefaced by syntax "ln #" where "n" denotes the number of entries in the vector. In other implementations, the length feature is a number representing the entire length of the corresponding URL component including special characters. The feature set at the second depth comprises the percent encoding feature, gibberish feature, email feature, file extension feature, and embedded domain feature. A second depth pattern formed with example values for the second depth feature set is the following:
 [ ] [ ][#xGm7d0q2][ ]

This pattern at the second depth indicates gibberish "xGm7d0q2" for the query component and null values for all other features at each URL component. The values for the feature set at the third depth, which is a malicious keyword feature, comprise malicious keywords. An example third depth pattern is the following:
 [#examplekw2][#examplekw3][ ][ ]

This pattern at the third depth indicates a malicious keyword "examplekw2" in the domain name component, a malicious keyword "examplekw3" in the path component, and no malicious keywords in the query component and fragment component. Note that in the example pattern 114, feature values in each feature set for a given URL component are separated by "#" syntax, values for a feature set at a given component are delimited by "[ ]" syntax, and patterns for feature sets are delimited across depths by "|" syntax. Other choices of syntax can be chosen, and in other implementations values for feature sets can be generated across components rather than for each component separately.

The example pattern 114 corresponds to any URL having these specified feature values for the corresponding feature sets, and a corresponding dashed leaf node in the example hierarchical structure 110 is labelled as malicious due to URLs associated with the dashed leaf node that match the example pattern 114 being malicious. An example malicious URL 112 that matches the example pattern 114 is the following: http://example.com/exampleimage.asp?imageid=abcdefg&type=0&resid=123456xGm7d 0q2

The packet analyzer 107 receives the malicious URLs 130 and performs corrective action for traffic corresponding to the packets 120 accordingly. For instance, the packet analyzer 107 can terminate flows and/or sessions established with IP addresses associated with URLs in the malicious URLs 130 (as determined, e.g., with a domain name system (DNS) resolver). The packet analyzer 107 can, based on determining that the malicious URLs 130 have a severity above a severity threshold, block all traffic to and from the endpoint device 101 (or, alternatively, any ports of the endpoint device 101 related to the traffic) and can display an alert at the endpoint device 101 indicating the malicious URLs 130 as well as known associated cybersecurity threats. The URL analyzer 105 can be a component of a firewall (not depicted) that can perform additional analysis of the malicious URLs 130 for future threat analysis and can associate malicious campaigns with subsets of the malicious URLs 130 associated with a same malicious attacker.

In addition to matching malicious URLs 130 from the intercepted URLs 100, the URL pattern matcher 109 may not be able to classify certain of the intercepted URLs 100 because they do not match any pattern in the malicious pattern database 102. The URL pattern matcher 109 communicates non-classified URLs 140 to a URL classification model 190. The URL classification model 190 performs additional analysis that can be offline, for instance by inputting feature representations of the non-classified URLs 140 into a machine learning model trained to detect malicious URLs and can perform additional analysis of metadata associated with the non-classified URLs 140 indicated in the packets 120 to identify malicious URLs 150. The URL classification model 190 communicates the malicious URLs 150 to the packet analyzer 107 for corrective action. The additional use of the URL classification model 190 detects more malicious URLs with a more thorough (slower, in some embodiments) analysis.

Additionally, the URL classification model 190 can receive subsampled URLs from the malicious URLs 130 to evaluate the false positive rate of the URL pattern matcher 109 according to verdicts given by the URL classification model 190. The false positive rate of the URL pattern matcher 109 on the subsampled URLs is thus the ratio of the number of subsampled URLs classified by the URL classification model 190 as benign to the total number of subsampled URLs. The subsampling rate can depend on available computing resources for evaluating the URL pattern matcher 109 (e.g., 10% of the malicious URLs 130) and can occur according to a fixed schedule and/or when the malicious pattern database 102 gets updated. The URL classification model 190 communicates false positive rates to the URL analyzer 105, and a high false positive rate for the URL pattern matcher 109 can prompt the URL analyzer 105 to generate a new hierarchical structure and/or collect additional URLs to update an existing hierarchical structure and extract patterns from the hierarchical structure to store in the malicious pattern database 102.

The malicious pattern database 102 is updated according to newly seen malicious and benign URLs according to a schedule (e.g., daily). The updates can be updates of a hierarchical structure (e.g., the example hierarchical structure 110) or can be initialization and construction of an additional hierarchical structure. Each hierarchical structure can correspond to a distinct malicious campaign associated with the malicious URLs used for construction. Operations for constructing and updating hierarchical structures are described in greater detail with reference to FIG. 2.

Figure 2:
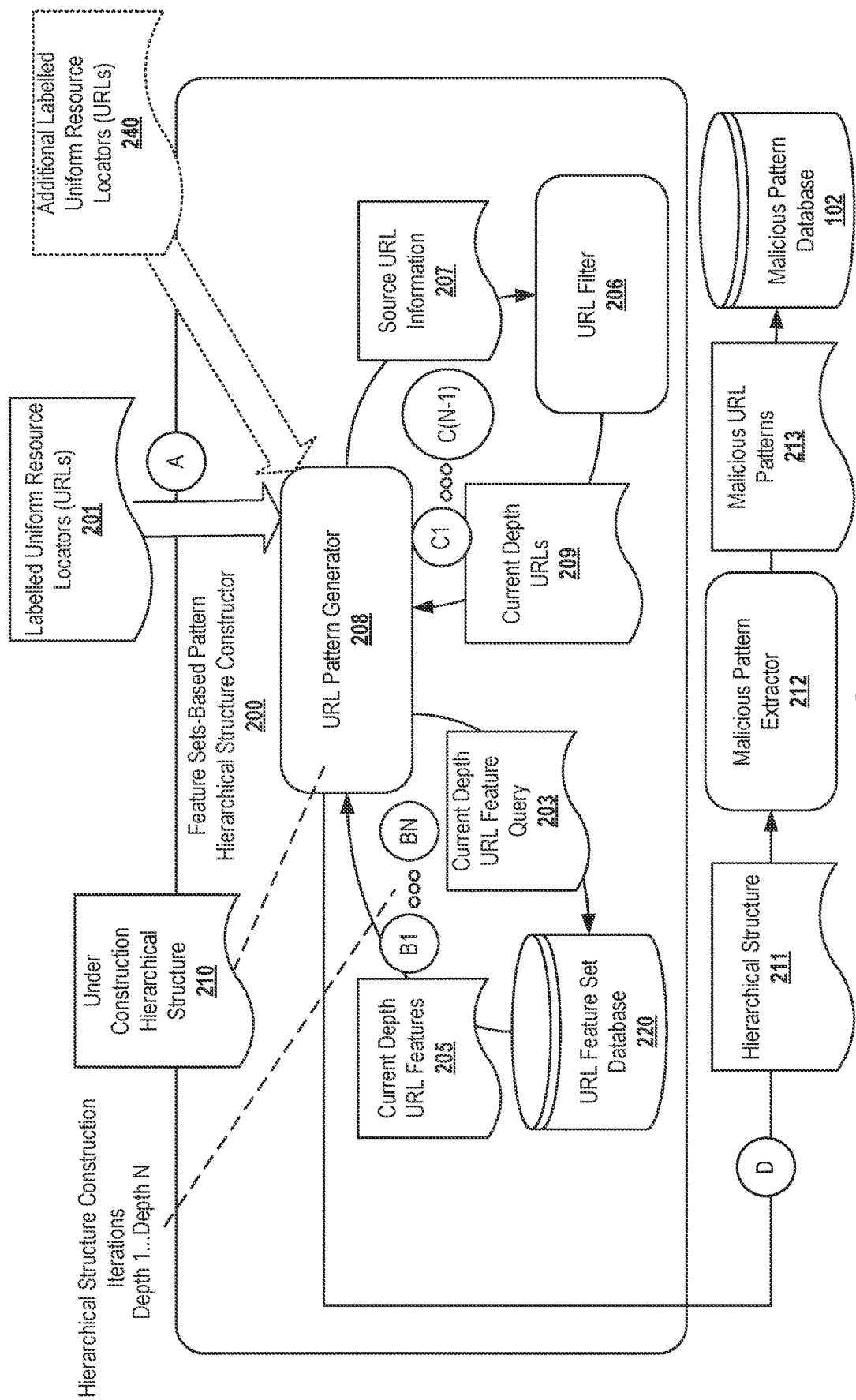
FIG. 2 is a schematic diagram of an example system for constructing hierarchical structures from known malicious and benign URLs.

FIG. 2 is a schematic diagram of an example system for constructing a hierarchical structure from known malicious and benign URLs. A feature sets-based pattern hierarchical structure constructor 200 ("hierarchical structure constructor") receives labelled URLs 201 and populates a hierarchical structure 211 with nodes associated with values for feature sets of the labelled URLs 201. This occurs iteratively for each depth (represented as N depths in FIG. 2 corresponding to stages B1-BN and C1-C(N-1) using values for a unique feature set at each depth. Once populated, the malicious pattern extractor 212 extracts malicious URL patterns 213 from the hierarchical structure 211 and stores them in the malicious pattern database 102.

FIG. 2 is annotated with a series of numbers/letters A, B1-BN, C1-C(N-1), and D. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, the hierarchical structure constructor 200 receives labelled URLs 201. The labelled URLs 201 have ground-truth labels of malicious or benign. The labels can be determined, for instance, by a firewall analyzing URLs. The firewall can additionally associate malicious campaigns with URLs and URLs can be grouped by associated malicious campaigns. A distinct hierarchical structure can be constructed for each malicious campaign to track patterns for URLs specific to each campaign. The hierarchical structure 211 can be constructed for one such malicious campaign.

The iterations B1-BN and C1-C(N-1) are represented for each depth 1 . . . N of the hierarchical structure 211. Each iteration occurs by performing the operations at stage B for an iteration (e.g., stage Bk for some integer k=1 . . . N) and then the operations at stage C (e.g., stage $C_k$). For instance, hierarchical structure construction occurs starting at stage B1, then to stage C1, then to stage B2, etc. At each of the B1-BN a URL pattern generator 208 queries a URL feature set database 220 with a current depth feature set query 203 corresponding to a current depth of the hierarchical structure. The URL feature set database 220 returns current depth URL features 205 for which values are to be generated at the current depth. While depicted as a separate database for illustrative purposes, the URL pattern generator 208 can have feature sets at every depth hardcoded (for instance, as fixed functions in code) and need not query a separate database for features corresponding to the current depth.

At stage B1, the URL pattern generator 208 generates values for each of the URLs 201 for a URL feature set indicated in the current depth URL features 205 at depth 1 (feature set $205_1$). The URL pattern generator 208 generates the feature set values for specified components of each URL and assembles the feature set values of the URL components into a feature set pattern. The URL pattern generator 208 attempts to update an under construction hierarchical structure 210 to indicate the feature set pattern at a depth 1 node and a benign or malicious indicator based on whether the URL is malicious or benign. If the feature set pattern is already present in a depth 1 node of the under construction hierarchical structure 210, then the URL pattern generator 208 determines whether the malicious/benign label for the node is the same as the label for the URL or is already set to indicate mixed. If the malicious/benign label of the node with the feature set pattern is not the same as the URL, then the node is set to indicate mixed. The URL pattern generator 208 maintains information 207 indicating a source URL(s) from which a feature set pattern indicated in a node was obtained. For instance, each node may have a temporary reference to source URLs. The source URL information is used for filtering before processing proceeds to a next depth of construction. The source URL information 207 can be the listing of source URLs referenced by the nodes in the under construction hierarchical structure 210 or logical associations of the nodes in the under construction hierarchical structure 210 to referenced source URLs.

At stage C1, the URL pattern generator 208 filters the URLs 201 with a URL filter 206 to remove benign URLs with benign nodes at depth 1 in the under construction hierarchical structure 210. The URL filter 206 can traverse the benign nodes in depth 1 of the under construction hierarchical structure 210, follow references or read indications of the source URL(s) as indicated by the source URL information 207, which will be benign, and remove those benign URLs from consideration in constructing the next depth. These benign URLs can be removed from consideration because a malicious pattern extracted from the eventually completed hierarchical structure will not include a benign node in the path. The remaining URLs are the current depth URLs 209 or URLs 2092.

At stage Bk (k=2 . . . N), the URL pattern generator 208 generates values of the URL features $205_k$ for each of the URLs $209_k$. As stated earlier, the URL pattern generator 208 submit a query $203_k$ to the database 220 to determine the feature set for depth k. With the generated values of each URL, the URL pattern generator 208 forms a feature set pattern for the URL and attempts to update the under construction hierarchical structure 210 at depth k. Using the source URL information 207, the URL pattern generator creates an edge connecting a node in depth k to a node in depth k-1 that has a same source URL(s). The node at depth k is associated with the feature set pattern for the URL in depth k appended to previous feature set patterns associated with the adjacent node in depth k−1. The node at depth k is also given a mixed, malicious, or benign label based on the source URL(s). Because the feature set pattern for the URL features $205_k$ can correspond to fewer source URL(s) than the node at depth k−1, the node at depth k−1 can have a mixed label that becomes a malicious or benign label for the adjacent node at depth k. The URL pattern generator updates the source URL information 207 according to the updates at depth k of the structure 210.

At stage Ck, the URL pattern generator 208 filters the current depth URLs $209_k$ with a URL filter 206 to remove benign URLs with benign nodes at depth k in the under construction hierarchical structure 210, unless the current depth is the final depth. The URL filter 206 can traverse the benign nodes in depth k of the under construction hierarchical structure 210 and follow references or read indications of the source URL(s) as indicated by the source URL information 207, which will be benign, and remove those benign URLs from consideration in constructing the next depth (k+1). After filtering, construction proceeds to the next depth unless the current depth is the last depth of the structure 210 (i.e., if k<N, then k=k+1).

At stage D, the URL pattern generator 208 communicates the now-populated hierarchical structure 211 to the malicious pattern extractor 212. The malicious pattern extractor 212 identifies malicious leaf nodes in the hierarchical structure 211 to extract sequences of values for URL feature sets (i.e., patterns) corresponding to paths for URLs associated with malicious nodes and encodes these malicious patterns as strings in the malicious URL patterns 213. The malicious URL patterns 213 can be encoded as strings comprising values for each feature set applied to each component of corresponding URLs, wherein values for feature sets across URL components at each depth can be delimited by "[ . . . ]" syntax, and feature sets across depths can be delimited by "I" syntax. The malicious pattern extractor 212 communicates malicious URL patterns 213 extracted for each malicious leaf node to the malicious pattern database 102 for future malicious URL detection.

Example features at a first depth comprise alphabet statistics, TLD, and URL length. Example features at a second depth comprise percent encoding, URL gibberish, email addresses, file extensions, and embedded domains. Example features at a third depth comprise keywords that match a database of known malicious keywords. Note that certain of these example features can be extracted directly from the URL string according to known/standardized URL syntax, for instance the TLD, "%" syntax corresponding to percent encoding, standardized file formats, standardized email address formats, etc. The embedded domain feature refers to fake domains embedded in URLs that are made to resemble well-known domains to improve trustworthiness of malicious URLs by a user. The embedded domains can be detected by matching domains in URLs that are not TLDs with a list of trusted TLDs. URL gibberish can be detected using a text-based Markov chain model that predicts likely and unlikely character sequences, where the unlikely character sequences can be determined based on a probability indicating likelihood output by the Markov chain model being below a threshold probability. The keywords feature can be generated using a string-matching algorithm against strings in a database of known malicious strings. The hierarchical structure 211 can be periodically updated by the hierarchical structure constructor 200. Additional labelled URLs 240 can be used for the update. The URL pattern generator 208 reiterates through the operations at stages B1-BN and C1-C(N−1). At each iteration/depth, existing malicious and benign nodes can become mixed based on the additional labelled URLs 240. This can affect filtering of source URLs for benign nodes that are flipped to mixed since these benign URLs are no longer filtered from hierarchical structure construction at subsequent depths. The updates can occur according to a fixed schedule (e.g., daily, weekly) or as labelled URLs for additional/not previously seen malicious attacks are collected.

Figure 3:
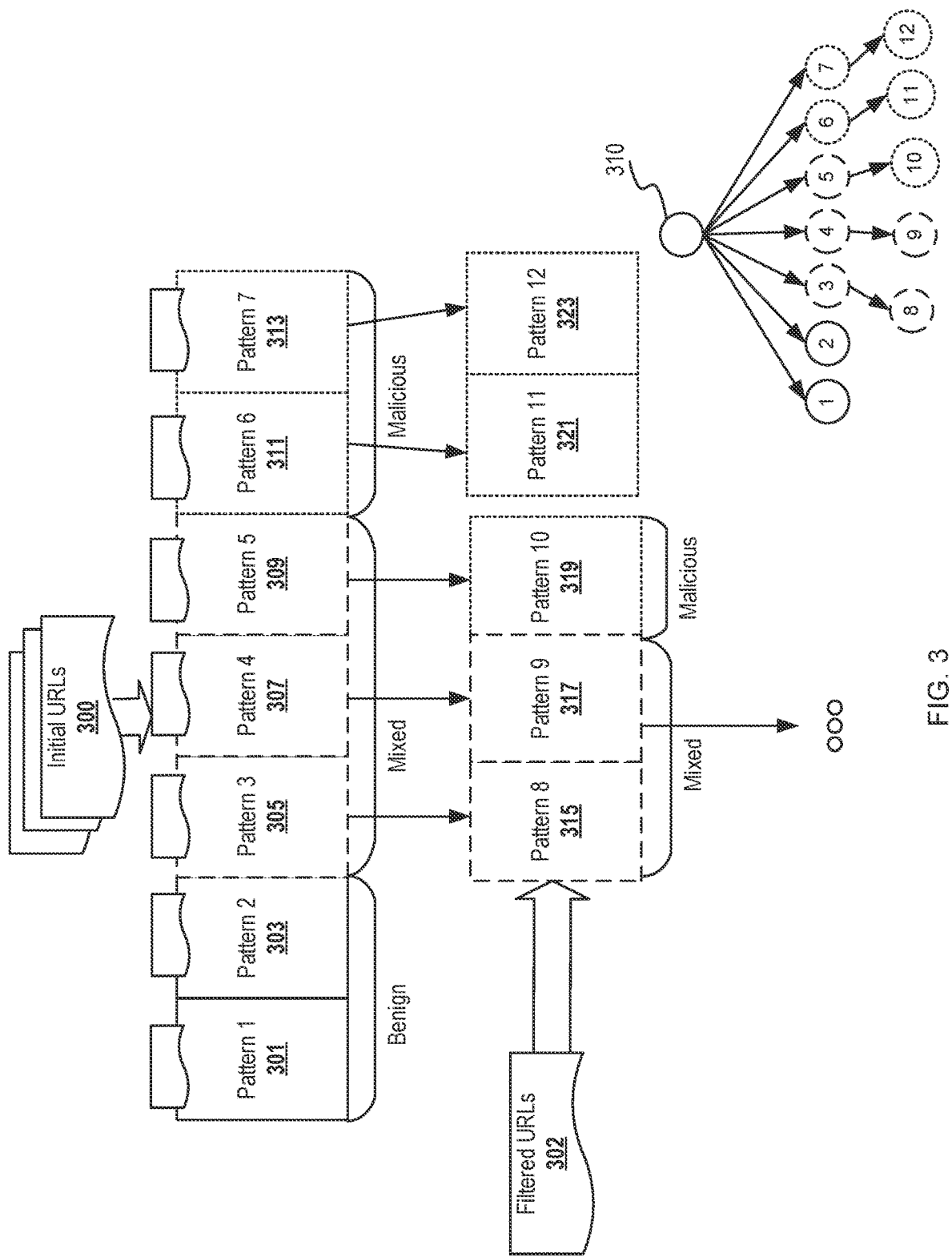
FIG. 3 is an illustrative diagram of URL patterns at successive depths in a hierarchical structure with benign, malicious, and mixed indicators.

FIG. 3 is an illustrative diagram of URL patterns at successive depths in a hierarchical structure with benign, malicious, and mixed indicators. Values for features in a feature set at a first depth of an example hierarchical structure 310 are generated from initial URLs 300. Unique patterns generated from the initial URLs 300 for the feature set at the first depth in the example hierarchical structure 310 are represented by patterns 301, 303, 305, 307, 309, 311, and 313. Pattern 1 301 and pattern 2 303 comprise values that are generated from only benign URLs in the initial URLs 300. Pattern 3 305, pattern 4 307, and pattern 5 309 comprise values that are generated from both malicious URLs and benign URLs in the initial URLs 300. Pattern 6 311 and pattern 7 313 comprise values generated from only malicious URLs in the initial URLs 300. Each of the patterns 301, 303, 305, 307, 309, 311, and 313 are respectively associated with nodes 1, 2, 3, 4, 5, 6, and 7 in the example hierarchical structure 310, and each of the nodes 1-7 has an edge to a root node that is not associated with any patterns/URLs.

Unique patterns of filtered URLs 302 for features in a feature set at a second depth of the example hierarchical structure 310 comprise patterns 315, 317, 319, 321, and 323. The filtered URLs 302 comprise URLs in the initial URLs 300 that are source URLs for mixed/malicious nodes 3-7 while URLs in the initial URLs 300 that are source URLs for benign nodes 1-2 are filtered at later depths. Pattern 8 315 and pattern 9 317 comprise pattern that are generated from both malicious URLs and benign URLs in the filtered URLs 302. Pattern 10 319, pattern 11 321, and pattern 12 323 comprise values generated from only malicious URLs in the filtered URLs 302. The patterns 315, 317, 319, 321, and 323 are respectively associated with nodes 8, 9, 10, 11, and 12 in the example hierarchical structure 310. Edges from nodes 3 to 8, 4 to 9, 5 to 10, 6 to 11, and 7 to 12 indicate that the source URLs in the filtered URLs 302 that generated patterns 305, 307, 309, 311, 313 also generated patterns, 315, 317, 319, 321, 323, respectively. Although not depicted in FIG. 3, any of the patterns 305, 307, 309, 311, and 313 can correspond to URLs that have different patterns at the second depth of the example hierarchical structure 310 which would result in one of the nodes 3-7 having multiple child nodes corresponding to each of the different patterns.

Figure 4:
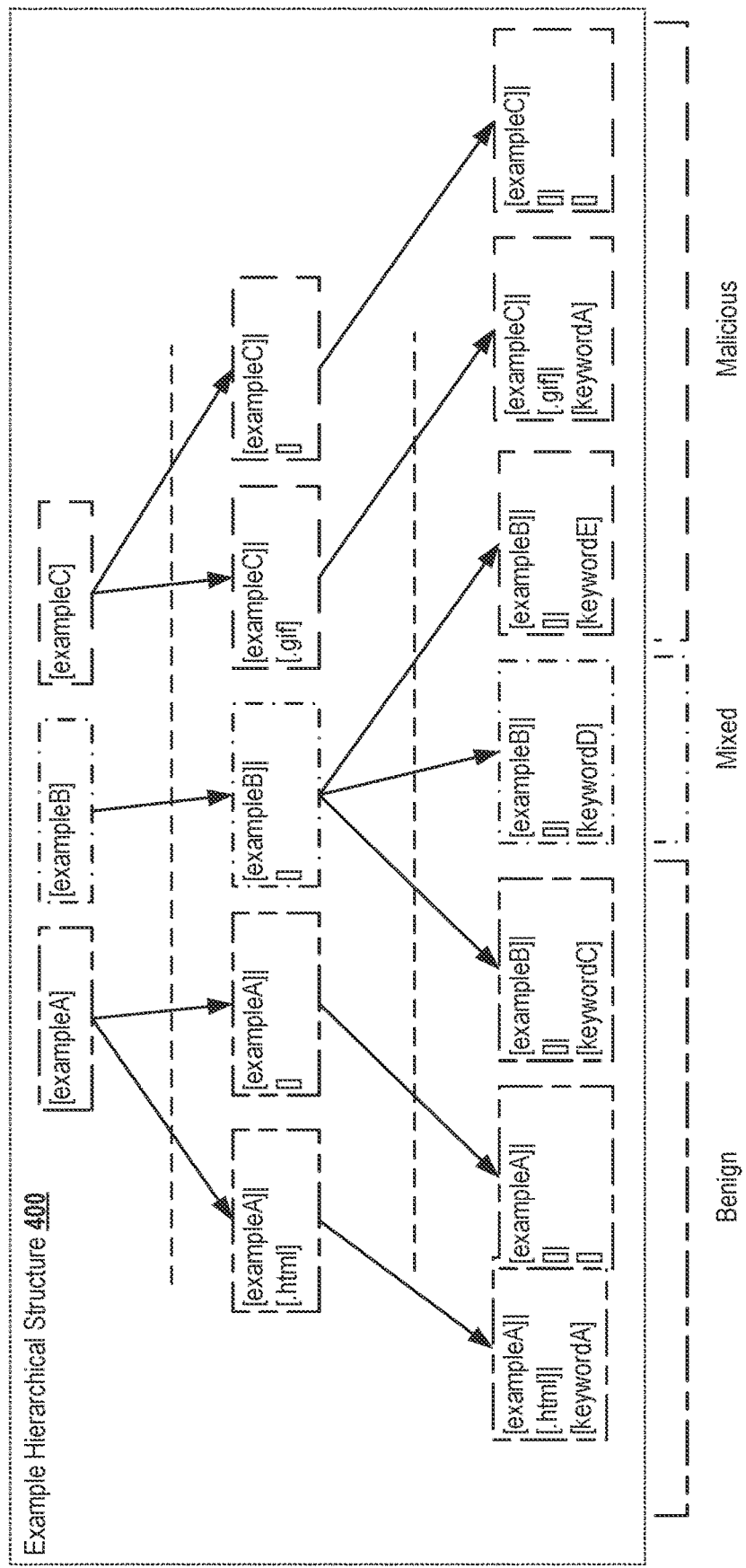
FIG. 4 is an illustrative diagram of an example feature sets patterns hierarchical structure.

FIG. 4 is an illustrative diagram of an example feature sets patterns hierarchical structure. A first depth of an example hierarchical structure 400 comprises patterns [exampleA], [exampleB], and [exampleC]. A second depth of the example hierarchical structure comprises patterns [exampleA]|[.html] and [example A]|[ ] associated with a child node of the node for [exampleA], a pattern [exampleB]|[ ] associated with a child node of the node for [exampleB], and patterns [exampleC]|[.gif] and [exampleC]|[ ] associated with a child node of the node for [exampleC]. Finally, a third depth of the example hierarchical structure comprises a pattern [exampleA]| [.html]| [keywordA] associated with a child node of the node for [example A]|[.html], a pattern [exampleA]|[ ]|[ ] associated with a child node of the node for [exampleA]|[ ], patterns [exampleB] [ ]|[keywordC], [exampleB] [ ]|[keywordD], and [exampleB] |[ ]|[keywordE] associated with a child node of the node for [exampleB]|[ ], pattern [exampleC]|[.gif]|[keywordA] associated with a child node of the node for [exampleC]|[.gif], and pattern [exampleC]|[ ]|[ ] associated with a child node of the node for [exampleC]|[ ].

Note that in the example hierarchical structure 400, patterns associated with nodes in later depths include patterns associated with nodes in previous depths. In other embodiments, patterns associated with nodes can be values of feature sets for URLs solely at the corresponding depth. Patterns [exampleA]| [.html]| [keywordA], [exampleA]|[ ]| [ ], and [exampleB]|[ ]|[keywordC] comprise values of feature sets for only benign URLs, pattern [exampleB]| [ ]|[keywordD] comprises values of feature sets for both malicious and benign URLs, and patterns [exampleB]| [ ]|[keywordE], [exampleC]|[.gif]|[keywordA], and [exampleC] [ ]|[ ] comprise values of feature sets for only malicious URLs. Malicious patterns can be generated from the latter three patterns by arranging values for feature sets contained in the pattern according to the hierarchy of the example hierarchical structure 400 (i.e., first depth feature set first, second depth feature set second, etc.) and encoding the values of feature sets as strings. FIG. 4 is depicted with benign patterns propagating to leaf nodes in the example hierarchical structure 400. Alternatively, URLs for benign nodes can be filtered at each depth and benign nodes will not be generated as children of benign nodes at previous depths.

FIGS. 5, 6A, 6B, and 6C are flowcharts of example operations for detecting malicious URLs with feature sets patterns matching and constructing/updating a hierarchical structure of URL feature sets patterns. The example operations are described with reference to a network security appliance for ease of understanding. The form factor of the network security appliance may be hardware or software (e.g., a virtual firewall implemented on a cloud resource). In addition, organization of program code to perform the example operations can vary due to platform, programmer/architect preferences, programming language, etc. In addition, names of code units (programs, modules, methods, functions, etc.) can vary for the same reasons and can be arbitrary.

Figure 5:
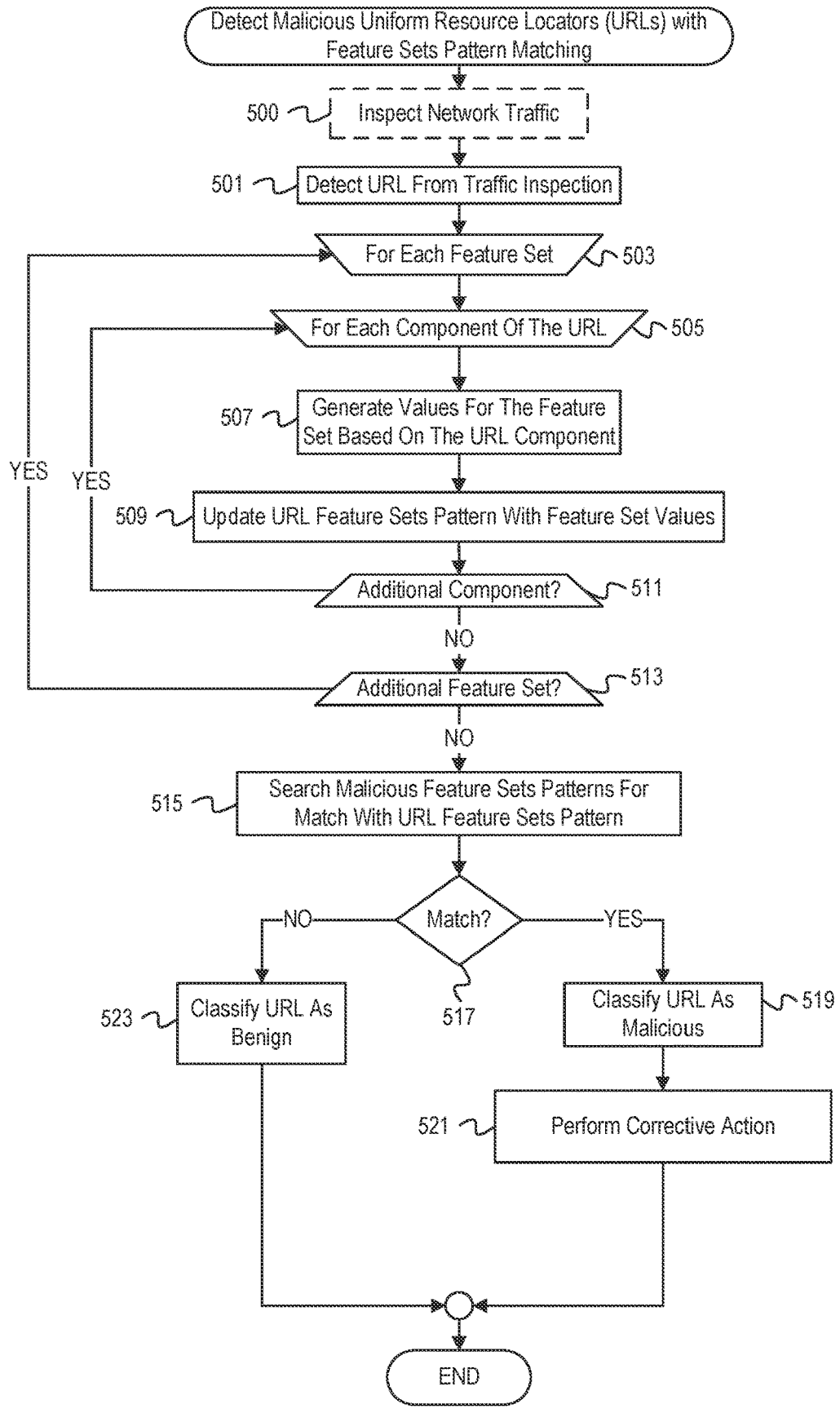
FIG. 5 is a flowchart of example operations for detecting malicious URLs with hierarchical structures.

FIG. 5 is a flowchart of example operations for detecting malicious URLs with feature sets pattern matching. The pattern matching uses a repository or database of malicious feature sets patterns that have been extracted from a hierarchical structure as described earlier. The repository can be updated during traffic processing and updates occur external to the traffic processing.

At block 500, a network security appliance inspects network traffic flowing across the network security appliance. Block 500 is depicted with medium-dashed lines to denote that the operations at block 500 occur independently of the remaining blocks in FIG. 5 until an external entity (e.g., a manager of firewall security policies) intervenes. Inspection of the network traffic at least includes the network security appliance inspecting protocol data units (PDUs) (e.g., packets, datagrams, or segments) for URLs.

At block 501, the network security appliance detects a URL during the network traffic inspection. Likely, the network security appliance is inspecting multiple flows of network traffic and can detect numerous URLs across the flows being inspected. Thus, different sub-processes or child threads may be spawned for analysis of the detected URLs. To avoid obfuscation, this description refers to single URL detection.

At block 503, the network security appliance selects a feature set as part of iterating through the feature sets that have been defined for pattern matching. Assuming a tree as the hierarchical structure that is the basis of the malicious feature sets patterns, there will be N feature sets corresponding to the N depths of the tree. Order of iteration should align with the pattern design (i.e., order of appearance of the feature sets in patterns). Assuming an implementation that begins at the patterns with the feature set of depth 1, the operations will select feature set of depth 1 first and then proceed to feature set of depth N.

At block 505, the network security appliance selects a component as part of iterating through the components of the detected URL. While implementations can iterate through components in different orders, this description will presume an iterative selection in order of host domain component, path component, query component, and then fragment component. Some URLs will not have a path component, query, and/or fragment component, which will result in an empty set for the feature set values. While depicted as iterating through components and generating values of feature sets using particular components, the network security appliance can generate certain feature sets across URL components for instance, by string matching the URL with a database of malicious strings.

At block 507, the network security appliance generates values for the currently selected feature set based on the currently selected URL component. For instance, the network security appliance may invoke a function defined for generating the value(s) for each feature of the currently selected feature set. Using the earlier example, the network security appliance invokes a function that generates the alphabet statistics of the currently selected URL component, invokes a parser that extracts the TLD of the currently selected component, and invokes a function that determines a length of the currently selected URL component.

At block 509, the network security appliance updates a URL feature sets pattern with the generated values. Initially, the URL feature sets pattern will be an empty pattern. The first set of generated feature set values will be inserted at the beginning of the pattern, presumably. Formation of a URL feature sets pattern can vary in technique. However, the pattern design during traffic processing is consistent with the pattern design of the malicious feature sets patterns to facilitate match determination. Each subsequent update, in this example description, will concatenate or append the generated feature set values. If the malicious feature sets patterns are encoded as strings, then the eventually generated URL feature sets pattern will be a string. Implementations are not limited to converting a feature value(s) for string matching at a particular point in time. For instance, values for each feature set can be converted to a string or the sequence of values across feature sets can be converted after the values have been generated. The program structure will depend upon program preference/design.

The network security appliance continues iterating through URL components and feature sets. At block 511, the network security appliance determines whether there is an additional URL component to process. If so, operational flow returns to block 505. Otherwise, operational flow continues to block 513. At block 513, the network security appliance determines whether there is an additional feature set to select. If so, operational flow returns to block 503. If not, then operational flow proceeds to block 515.

At block 515, the network security appliance searches the malicious feature sets patterns for a match with the generated URL feature sets pattern. This can be a query to a database with the URL feature sets pattern as a key. An example URL feature sets pattern comprises the following pattern:

[a3A0n0s1 #com #l2 #l3,7][a3A0n0s5 #l3 #9,12,9][ ][ ][ ][#html][ ][ ][#nkw0][ ][ ][ ]

This pattern is formed from feature values as strings with delimiters to delineate each feature within a feature set, each set of values for a feature set for a component, and the different feature sets. Each set of feature set values for a component is delimited by "[ . . . ]" syntax. Each feature within a feature set is delimited by "#" syntax. And the pattern separates different feature sets with the delimiting "|" syntax. The pattern of the first depth feature set across URL components, is
[a3A0n0s1 #com #l2 #l3,7][a3A0n0s5 #l3 #9,12,9][ ][ ]. The pattern of the second depth feature set across URL components is [ ][#html][ ][ ]. The pattern of the third depth feature set across URL components is [#nkw0][ ][ ][ ]. Each depth specific pattern indicates 4 components since there are four sets of brackets. The first depth feature set includes values across components for an alphabet statistics feature and a TLD feature, among others. In the second depth feature set pattern, "html" is the value for a file extension feature. In the third depth feature set pattern, "nkw0" represents a keyword for a keyword feature. Assuming this URL feature sets pattern is constructed from a detected URL, a network security appliance searches for a matching string among the malicious feature sets patterns in the database. A match would include blank/null/empty features where there are blank/null/empty features in the above string. The string matching can be according to a string-matching algorithm such as the Knuth-Morris-Pratt string-searching algorithm.

At block 517, the network security appliance determines whether the search yielded a match. If a match was found, then operational flow proceeds to block 519. If not, then operational flow proceeds to block 523.

At block 519, the network security appliance classifies the URL as malicious based on the pattern match. The indication of the malicious verdict can be implemented according to any one of various techniques. For example, the URL can be tagged with the malicious verdict. A notification of the malicious verdict can be communicated to a traffic processor with a reference to the URL.

At block 521, the network security appliance performs a corrective action based on the classification of the detected URL as malicious. The network security appliance can terminate a session or flow in which the malicious URL was detected. The network security appliance can further block all traffic sessions with a same destination IP address or other metadata indicated in PDUs in which the malicious URL was detected. Additional corrective actions can be to block all traffic at corresponding endpoint devices, determining severity levels of attacks corresponding to the set of malicious URLs, associating the malicious URLs with malicious campaigns, and performing additional analysis with a separate firewall.

If no match was found for the URL feature sets pattern, then the URL is classified as benign. This indication of a benign verdict can be explicit or implicit. Implicit indication of the benign verdict can be the lack of any further action related to the URL.

Embodiments can use the classified URLs for further updating of the feature sets patterns hierarchical structure, perhaps after validation. In addition, embodiments may take additional measures on a malicious verdict before taking corrective action to avoid mistaken interruption of network traffic. For example, a URL classified as malicious may be input into a trained model for classification verification.

Figure 6A:
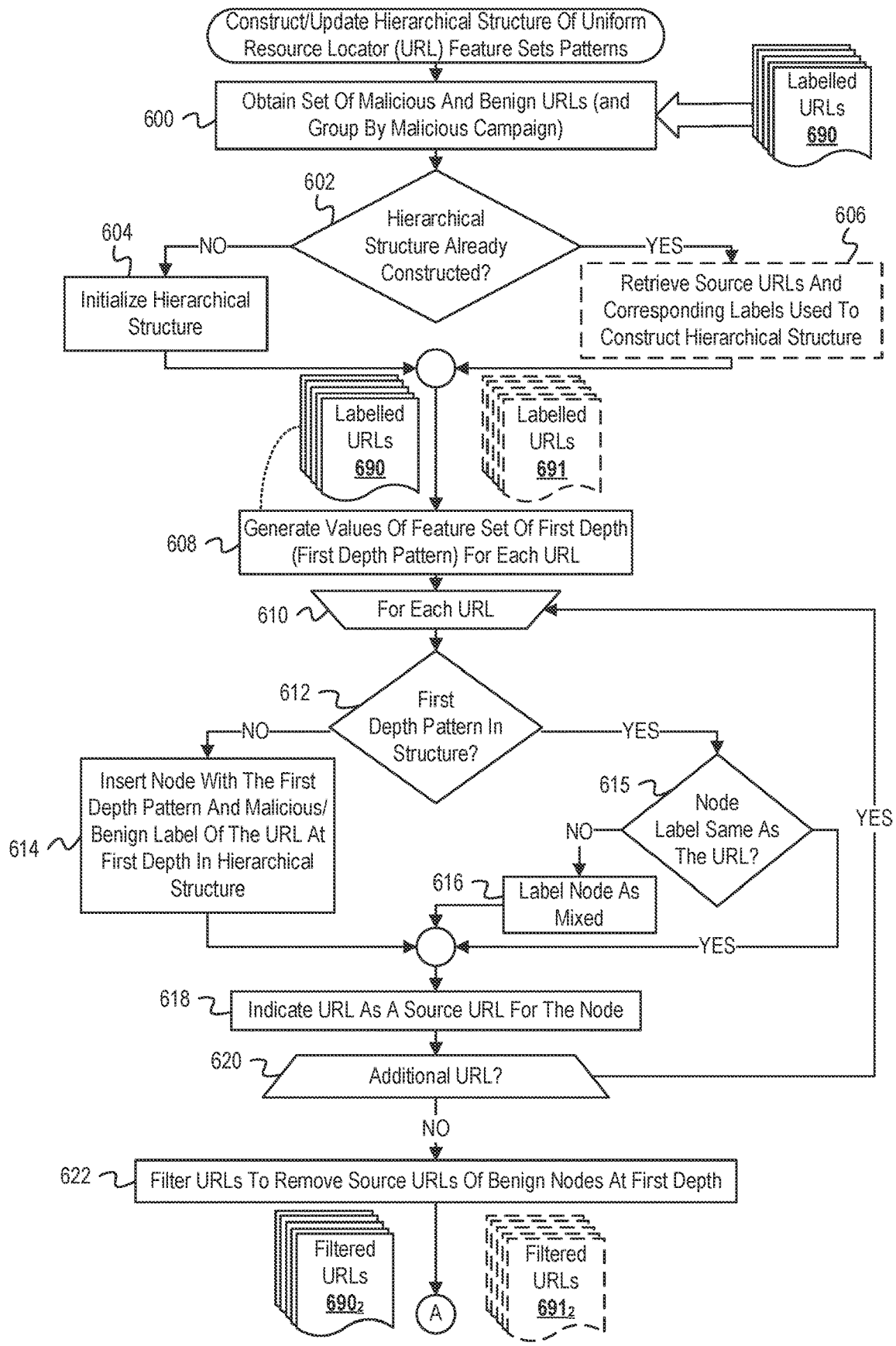
FIGS. 6A, 6B, and 6C are collectively a flowchart of example operations for constructing/updating a hierarchical structure of URL feature sets patterns.
Figure 6B:
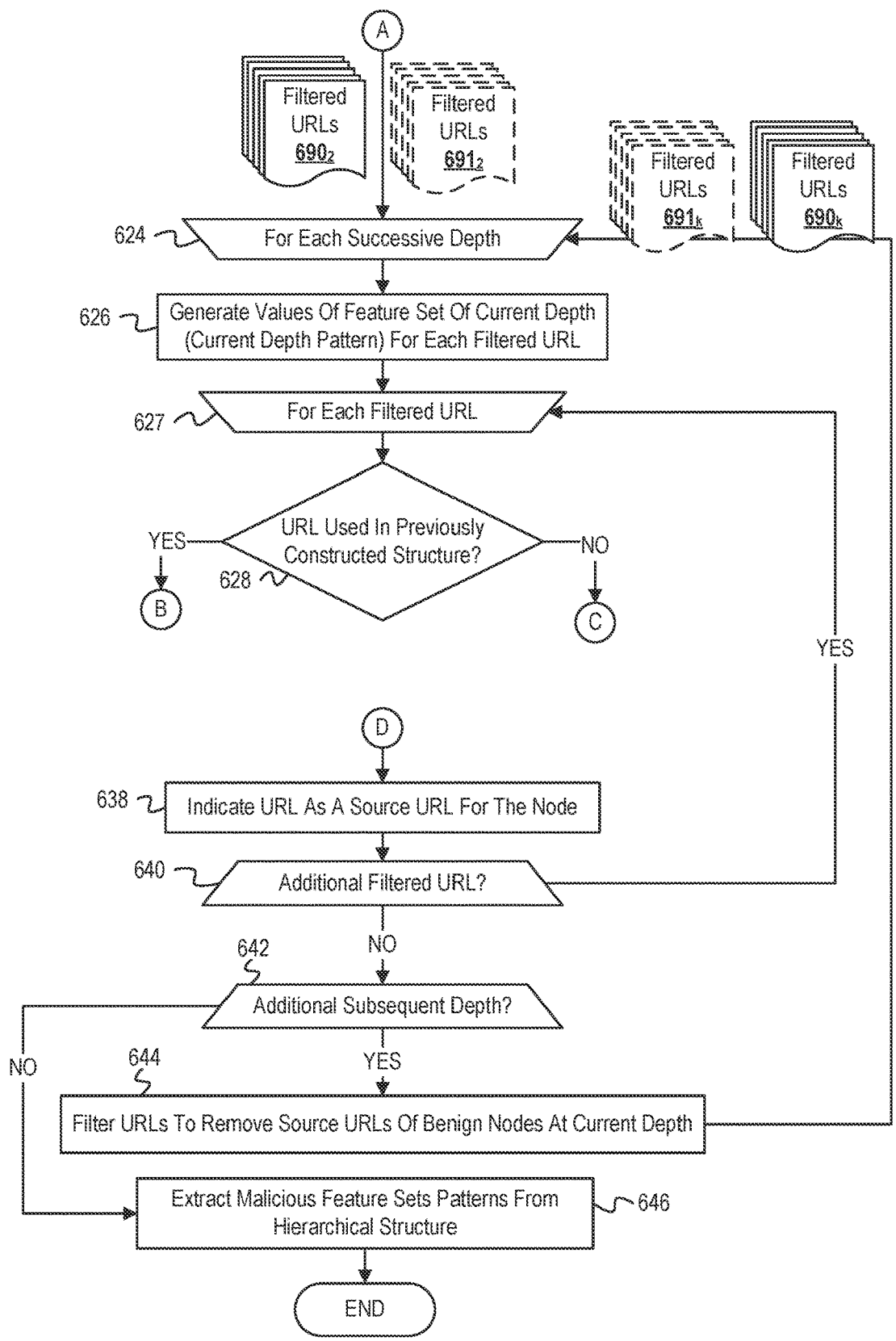
Figure 6C:
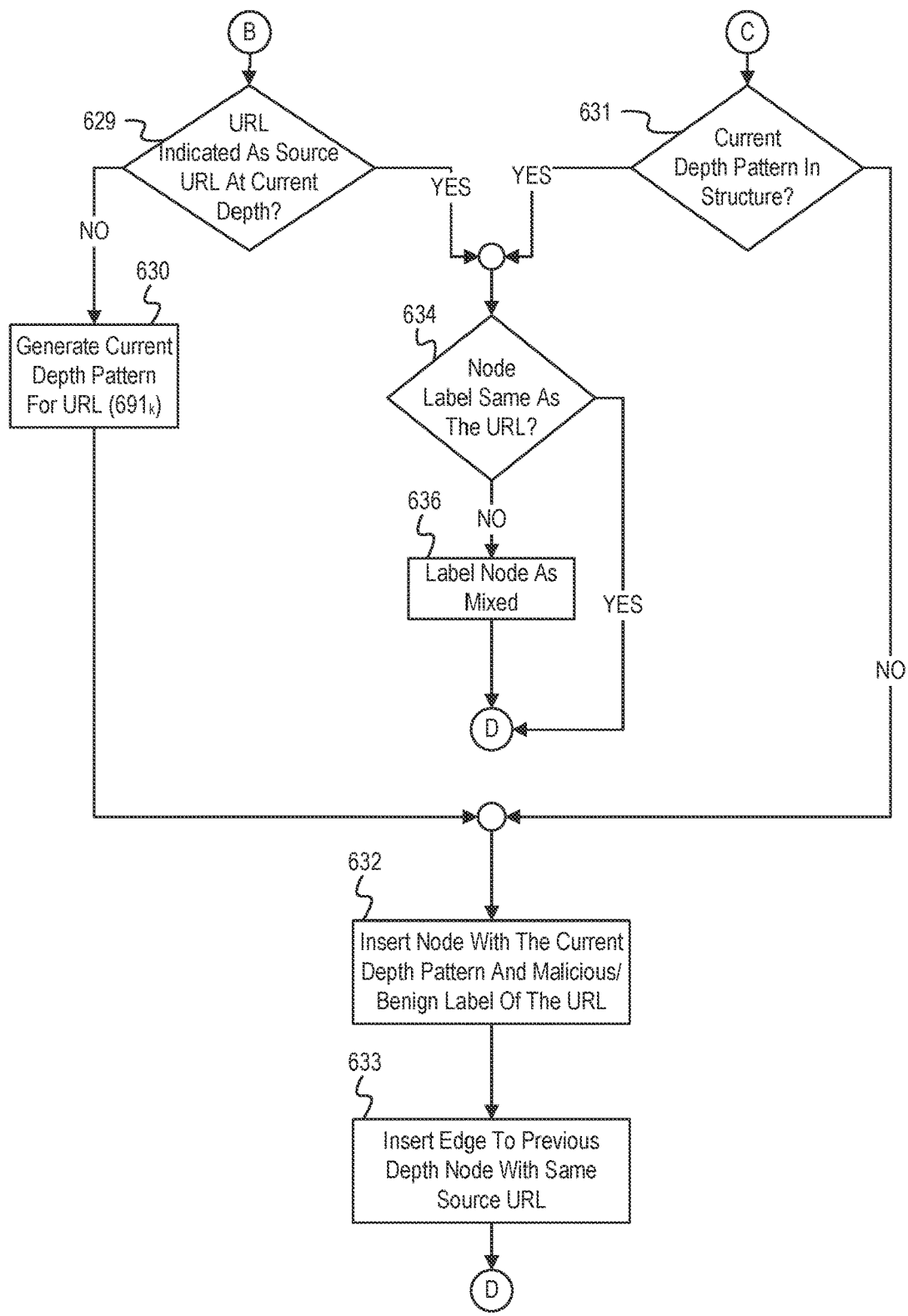

FIGS. 6A, 6B, and 6C collectively form a flowchart of example operations for constructing/updating a hierarchical structure of URL feature sets patterns. In addition to a constructing and updating a structure for detecting malicious URLs in traffic, embodiments can perform the example operations to construct/update a hierarchical structure for a malicious campaign. The detecting mechanism could use malicious campaign structures as a supplement to a primary structure. Embodiments may carve out URLs of campaigns for constructing/updating a malicious campaign structure but not the primary structure. The operations in FIGS. 6A and 6B are depicted with two possible flows, one proceeding at block 604 and one proceeding at block 606. Block 606 is depicted with medium-dashed lines to indicate that the corresponding flow additionally uses corresponding URLs depicted with medium-dashed lines for hierarchical structure updates. Operations for the flow proceeding at block 604 omit URLs depicted with medium-dashed lines throughout and subsequent operations for determining whether URLs were used in a previously constructed hierarchical structure can be omitted.

At block 600, a network security appliance obtains a set of labelled URLs 690 classified as malicious or benign. Embodiments may group the labelled URLs 690 by associated malicious campaigns. A malicious campaign is a campaign that uses a group of URLs for a malicious purpose, such as malware distribution or phishing attacks. The URLs used in a malicious campaign can be used to construct a hierarchical structure of feature sets patterns for the malicious campaign that is distinct from the structure to be more broadly used.

At block 602, the network security appliance determines whether a hierarchical structure corresponding to the labelled URLs 690 has already been constructed. The network security appliance can query a database of hierarchical structures with a malicious campaign associated with the labelled URLs 690 and/or can determine whether a hierarchical structure corresponding to other scoping metadata for the labelled URLs has been constructed. In some instances, a single hierarchical structure is maintained across URLs and the network security appliance verifies whether this hierarchical structure has been constructed. If a hierarchical structure has been constructed, operational flow proceeds to block 606. Otherwise, operational flow proceeds to block 604.

At block 604, the network security appliance initializes the hierarchical structure. The initial hierarchical structure comprises a single root node not associated with any source URLs or patterns. The network security appliance additionally determines feature sets for each depth with which to populate the hierarchical structure. The feature sets at each depth can be chosen to be likely to delineate between malicious and benign URLs and can be chosen to be more granular at subsequent depths to capture more detailed aspects of URLs. Operational flow proceeds to block 608.

At block 606, the network security appliance retrieves source URLs and corresponding labels used to construct the existing hierarchical structure. The source URLs and corresponding labels are represented as labelled URLs 691 depicted with a medium-dashed to indicate that the labelled URLs 691 are used for updating an existing hierarchical structure alongside the labelled URLs 690 whereas constructing a hierarchical structure from scratch is based on the labelled URLs 690. The labelled URLs 691 further comprise indications of nodes for which corresponding URLs are source URLs in the previously constructed hierarchical structure, for instance, as stored in a data structure associating node/source URL pairs for efficient lookup. Operational flow proceeds to block 608

At block 608, the network security appliance generates values of a feature set at a first depth ("first depth pattern") for each URL in the labelled URLs 690. Features in the feature set at the first depth can comprise an alphabet statistics feature, a TLD feature, and a length feature. The network security appliance can generate the feature set for each component of the labelled URLs 690. The first depth pattern and subsequent depth patterns are arranged according to pattern syntax that delimits features within feature sets and feature sets across components and syntax can vary according to formats of URL patterns used for malicious URL detection.

At block 610, the network security appliance selects a URL as part of iterating through URLs in the labelled URLs 690 to generate and update corresponding nodes at the first depth. Note that for a previously constructed hierarchical structure, nodes corresponding to first depth patterns of the labelled URLs 691 have been previously initialized and associated with source URLs, and the network security appliance omits these URLs from iterations.

At block 612, the network security appliance determines whether the first depth pattern of the current URL is in the hierarchical structure. The network security appliance attempts to match the first depth pattern against one of the patterns indicated at depth 1 nodes in the hierarchical structure, for instance, using a string-matching algorithm for exact pattern matches. If the first depth pattern of the current URL is in the hierarchical structure, operational flow proceeds to block 615. Otherwise, operational flow proceeds to 614.

At block 614, the network security appliance inserts a node with the first depth pattern and a label corresponding to the malicious/benign label of the current URL at the first depth in the hierarchical structure. The inserted node has an edge in the hierarchical structure to the root node. Operational flow proceeds to block 618.

At block 615, the network security appliance determines whether the node corresponding to the first depth pattern of the current URL has the same malicious/benign label as the current URL. If the labels are the same, operational flow skips to block 618. Otherwise, flow proceeds to block 616.

At block 616, the network security appliance labels the node corresponding to the first depth pattern of the current URL as mixed. Due to the label of the node being distinct from the label of the current URL, the node is associated with at least one malicious URL and at least one benign URL and therefore is mixed. Implementations can make an additional comparison to determine whether the node is already labeled as mixed and avoid the operation to write or indicated mixed or perform write mixed regardless of whether it already is labeled mixed. Operational flow proceeds to block 618.

At block 618, the network security appliance indicates the current URL as a source URL for the node. The current URL can be indicated in a data structure associating source URLs with nodes for the hierarchical structure. Alternatively, the current URL can be maintained in a database with metadata indicating a node identifier or other logical association with the node for future hierarchical structure updates.

At block 620, the network security appliance determines if there is an additional URL in the labelled URLs 690 for node initialization/updates. If there is an additional URL, operational flow returns to block 610. Otherwise, operational flow proceeds to block 622.

At block 622, the network security appliance filters URLs from labelled URLs 690 and labelled URLs 691 to remove source URLs of benign nodes at the first depth of the hierarchical structure. The network security appliance can search the hierarchical structure for nodes labelled as benign at the first depth and can retrieve source URLs for the benign nodes from a data structure associating nodes with source URLs. Filtering the labelled URLs 690 and labelled URLs 691 results in filtered URLs 6902 and filtered URLs 6912 respectively for the second depth. Operational flow proceeds to the operations depicted in to block 624 in FIG. 6B.

At block 624, the network security appliance selects a successive depth to the first depth as part of iterating through successive depths in the hierarchical structure. Iterations occur according to hierarchy of depths in the hierarchical structure. The network security appliance uses filtered URLs $690_k$ and filtered URLs $691_k$ filtered at a preceding depth k−1 to populate the hierarchical structure with nodes at a current depth k.

At block 626, the network security appliance generates values for a feature set at the current depth k ("current depth pattern") for each of the filtered URLs $690_k$. For instance, the current depth pattern at a second depth can comprise values for a feature set comprising a gibberish text feature, a file extensions feature, and embedded domains feature, a percent encodings feature, and an e-mail addresses feature. The current depth pattern at a third depth can comprise values for a feature set comprising a malicious keywords feature. Values for each feature can be generated for each component of the filtered URLs $690_k$, and each current depth pattern can comprise vectors of features in the feature set for each URL component. Current depth patterns for filtered URLs $691_k$ are generated at further operations.

At block 627, the network security appliance iterates through filtered URLs $690_k$, $691_k$ for populating the hierarchical structure at current depth k and adding edges from previous depth k−1 to current depth k.

At block 628, the network security appliance determines whether the current URL was used in the previously constructed hierarchical structure (i.e., whether the current URL is in filtered URLs $690_k$ or filtered URLs $691_k$). If the current URL was used in the previous hierarchical structure, operational flow proceeds to block 629. Otherwise, operational flow proceeds to block 631.

At block 629, the network security appliance determines whether the current URL is indicated as a source URL for a node at the current depth k. The network security appliance can search a data structure indicating source URLs and corresponding nodes for the hierarchical structure to make this determination. If the current URL is a source URL for a node at current depth k, operational flow proceeds to block 634. Otherwise, operational flow proceeds to block 630.

At block 630, the network security appliance generates a current depth pattern for the current URL. Generating the current depth pattern subsequent to verifying that the current URL is not already a source URL at the current depth avoids operational cost of generating current depth patterns for URLs already present in the hierarchical structure. Operational flow proceeds to block 632.

At block 631, the network security appliance determines whether the current depth pattern for the current URL is in the hierarchical structure at current depth k. If the current depth pattern is present at a node in the hierarchical structure at the current depth k, operational flow proceeds to block 634. Otherwise, operational flow proceeds to block 632.

At block 632, the network security appliance inserts a node with the current depth pattern and a malicious/benign label of the current URL at the current depth k in the hierarchical structure. Operational flow proceeds to block 633.

At block 633, the network security appliance inserts an edge in the hierarchical structure from the inserted node to a previous depth node having a same source URL. The network security appliance can search an index of source URLs associated with each node at the previous depth k−1 for the current URL. Alternatively, each of the filtered URLs $690_k$, $691_k$ can have associated indications of nodes at previous depths for which the filtered URLs are source URLs and the network security appliance can read and identify the previous depth node directly from the indications. The network security appliance additional stores the current depth pattern at the inserted node appended to the pattern at the previous depth node. The current depth pattern can be appended with a delimiter "|" to distinguish the current depth pattern from previous depth patterns. Operational flow proceeds to block 638.

At block 634, the network security appliance determines if the label of the current URL is the same as the label of the corresponding node. If the labels of the current URL and the node are the same, operational flow skips to block 638. Otherwise, operational flow proceeds to block 636.

At block 636, the network security appliance labels the node corresponding to the current URL as mixed. The node has the current URL as a source URL with a different label from previous source URLs associated with the node, implying that the node is associated with at least one malicious and at least one benign URL. Operational flow proceeds to block 638.

At block 638, the network security appliance indicates the current URL as a source URL for the node. The current URL can be indicated as a source URL for the node in any appropriate data structure that facilitates future association of the current URL with the node for updating the hierarchical structure and changing node labels according to associated URLs.

At block 640, the network security appliance determines whether there is an additional URL in the filtered URLs $690_k$, $691_k$. If there is an additional URL, operational flow returns to block 627. Otherwise, operational flow proceeds to block 642.

At block 642, the network security appliance determines whether there is an additional successive depth in the hierarchical structure. If there is an additional depth for the hierarchical structure, operational flow proceeds to block 644. Otherwise, operational flow skips to block 646.

At block 644, the network security appliance filters the filtered URLs $690_k$, $691_k$ to remove source URLs of benign nodes at current depth k. The network security appliance can search a data structure indicating source URL/node pairs at the current depth to identify and filter those of the filtered URLs $690_k$, $691_k$ that are source URLs for benign nodes at depth k. The resulting filtered URLs $690_{k+1}$, $691_{k+1}$ filtered from filtered URLs $690_k$, $691_k$ respectively are used by the network security appliance to populate nodes at depth k+1. Operational flow returns to block 624.

At block 646, the network security appliance extracts malicious feature sets patterns from the hierarchical structure. The network security appliance identifies leaf nodes in the hierarchical structure labelled as malicious and stores patterns at the malicious leaf nodes in a database for future malicious URL detection. The network can perform any further parsing/extraction steps to conform patterns at malicious leaf nodes in the hierarchical structure to a standardized format corresponding to the database.

Throughout the operations of FIGS. 6A, 6B, and 6C, when updating a previously constructed hierarchical structure, source URLs for the previously constructed hierarchical structure are verified to be source URLs at each depth in the hierarchical structure prior to generating patterns for that depth. This saves computational steps of generating a pattern for a source URL at a certain depth then subsequently determining that the source URL is already in the hierarchical structure at that depth. Other embodiments that simplify implementation are possible, for instance by constructing a new hierarchical structure from scratch using the labelled URLs 690 and labelled URLs 691. In embodiments where URLs are not filtered at each depth, generating patterns for the labelled URLs 691 is not necessary because the previously constructed hierarchical structure is already populated with patterns for these URLs at every depth.

Variations

The example operations depicted herein for constructions of hierarchical structures have certain implementation details that are provided for clarity and are not meant to be limited with respect to choices of implementation. For instance, the example hierarchical structure depicted in FIG. 4 stores feature values for feature sets at the current depth and all previous depths at each node. In other implementations, hierarchical structures can store only those values for features at the current depth at each node. In these implementations, extracting malicious patterns from hierarchical structures can comprise traversing the hierarchical structures from malicious leaf nodes to root nodes by the unique path between these nodes (the hierarchical structure is a tree so paths between nodes are unique). Construction of hierarchical structures is additionally described herein as removing URLs at each depth that are associated with benign nodes. In other implementations, URLs are not removed across depths and the full set of URLs is used for generating nodes at each depth.

Feature sets at each depth can vary with respect to syntax, order of features, and selection of features. While feature sets are depicted as being generated per URL component herein, in other embodiments feature sets can be generated across components. For instance, per-component malicious keyword features can instead comprise malicious keywords features across entire URLs. Types of delimiters between feature values, URL components, and feature sets can vary depending on implementations.

Also, the descriptions herein construct a hierarchical structure of feature sets patterns with a depth-by-depth pattern. Embodiments can construct the structure per URL. An embodiment can construct a path from root to leaf depth for each URL being processed for construction. For example, values for n feature sets can be generated from a URL to insert a path into a n-level structure.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations at block 509 can occur in parallel across feature sets and URL components and the operations at block 500 can occur in parallel and concurrently to the other blocks in FIG. 5. Classifying a URL as benign according to the operations depicted at block 523 in FIG. 5 is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
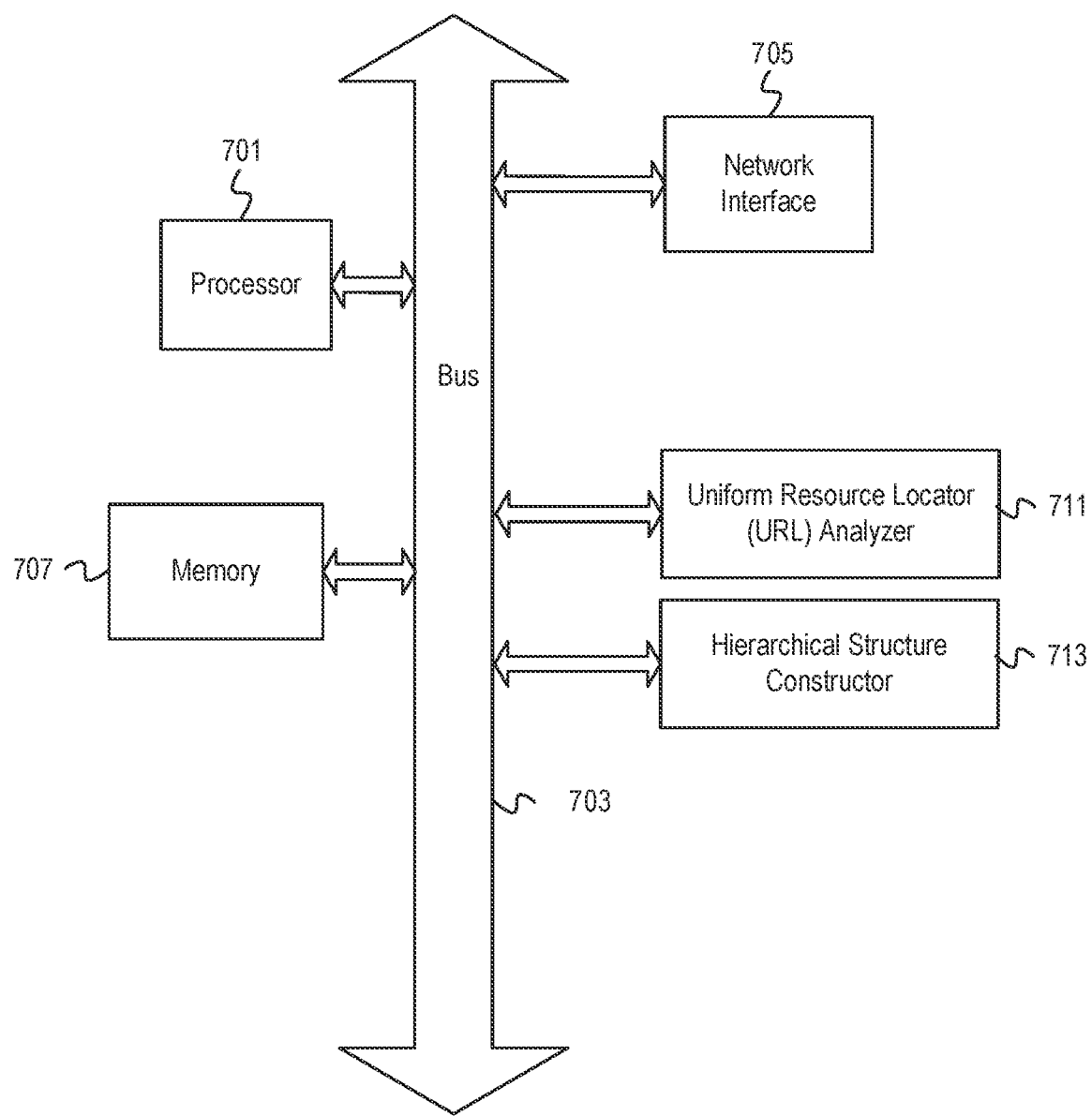
FIG. 7 depicts an example computer system with a URL analyzer and a hierarchical structure constructor.

FIG. 7 depicts an example computer system with a URL analyzer and a hierarchical structure constructor. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes a URL analyzer 711 and a hierarchical structure constructor. The hierarchical structure constructor 713 can generate a hierarchical structure with feature sets for URLs at each depth and patterns comprising values of the feature sets for URLs encoded at nodes in the hierarchical structure. The URL analyzer 711 can extract patterns from the hierarchical structure comprising feature values for nodes associated with malicious URLs and can match the patterns with URLs detected inline for traffic sessions to detect malicious activity. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

Terminology

A "feature" as used herein when referring to a feature of a URL refers to a segment(s) of a URL extracted from a particular component(s) of the URL, or one or more values generated based on segment(s) of the URL. Features can be generated from URLs using string-matching algorithms, syntax parsers, classification models, etc.

A "pattern" as used herein refers to a set of values for feature sets of a URL. Patterns can be encoded as strings with delimiters separating feature sets and delimiters separating feature values in each feature set.

A "hierarchical structure" refers to a data structure having depths, each depth comprising nodes in the hierarchical structure and edges connecting nodes across depths. Each node is associated with corresponding data which can include a pattern, source URLs matching the pattern, and a label for the node based on malicious or benign classifications of the source URLs matching the pattern.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
classifying a first uniform resource locator (URL) detected in a flow of network traffic as malicious or benign, wherein classifying the first URL comprises,
generating values for a plurality of feature sets based, at least in part, on components of the first URL, wherein generating the values of the plurality of feature sets comprises indicating within the values an empty set for one of the components of the first URL and one of the plurality of feature sets if no value can be generated from the one of the components for the one of the plurality of feature sets;

generating a first pattern for the first URL from the values of the plurality of feature sets; and determining whether the first pattern matches one of a plurality of malicious feature set patterns previously generated from a plurality of malicious and benign URLs; and indicating the classification of the first URL for handling the network traffic flow.

2. The method of claim 1, wherein feature set patterns from the plurality of malicious feature set patterns are extracted from a hierarchical structure of values for feature sets previously generated from the plurality of malicious and benign URLs.

3. The method of claim 1, wherein generating the first pattern comprises arranging the values according to order of the plurality of feature sets and feature order within each feature set as the plurality of malicious feature set patterns.

4. The method of claim 3, wherein generating the first pattern also comprises encoding the arranged values as a string, wherein the plurality of malicious feature set patterns is a plurality of strings.

5. The method of claim 3, wherein generating the first pattern also comprises ordering values of each of the plurality of feature sets according to order of the components within the URL.

6. The method of claim 5, wherein generating the first pattern comprises generating the first pattern with delimiters to delimit the values of different feature sets.

7. The method of claim 1, wherein generating the values of the plurality of feature sets comprises generating, for each component of the URL, values for the plurality of feature sets.

8. The method of claim 1, wherein URL features corresponding to the plurality of feature sets comprise alphabet statistics of a URL component, top-level domain, length of a URL component, gibberish text, file extensions, embedded domains, percent encodings, e-mail addresses, and keywords.

9. The method of claim 1, wherein each of the first URL components comprises at least one of a domain name, a path, and a query string.

10. A non-transitory computer-readable medium having stored thereon program code comprising instructions to:

generate a hierarchical structure using a plurality of feature sets and a first plurality of uniform resource locators (URLs) including malicious and benign URLs, wherein the instructions to generate the hierarchical structure comprise instructions to, for a first feature set of the plurality of feature sets at a first depth in the hierarchical structure, generate one or more first patterns corresponding to first values of the first feature set for components of the first plurality of URLs; and generate, at the first depth, one or more first nodes with indications of corresponding ones of the one or more first patterns and, for each node in the one or more first nodes and corresponding first pattern in the one or more first patterns, indications of whether URLs in the first plurality of URLs matching the first pattern according to the first values of the first feature set comprise one or more malicious URLs, one or more benign URLs, or both a malicious and a benign URL; and for a second feature set of the plurality of feature sets and for each first node of the one or more first nodes that includes indications of a subset of the first plurality of URLs comprising both a malicious URL and a benign URL, generate one or more second patterns corresponding to second values of the second feature set for components of the subset of the first plurality of URLs; and generate, at a second depth in the hierarchical structure successive to the first depth, one or more second nodes corresponding to the one or more second patterns with edges connected to the first node with indications of, for each second node of the one or more second nodes and corresponding second pattern of the one or more second patterns, whether the URLs in the subset of the first plurality of URLs matching the second pattern according to the second values of the second feature set correspond to one or more malicious URLs, one or more benign URLs, or both a malicious and a benign URL.

11. The computer-readable medium of claim 10, further comprising instructions to:

identify a plurality of leaf nodes in the hierarchical structure having indications of corresponding to malicious URLs; and for each leaf node in the plurality of leaf nodes,
extract third values for feature sets indicated in the leaf node;
arrange the third values according to hierarchy of corresponding feature sets in the hierarchical structure; and
indicate the arranged values of feature sets as a third pattern for malicious URL detection.

12. The computer-readable medium of claim 10, further comprising instructions to associate the hierarchical structure with a malicious campaign corresponding to at least a subset of the first plurality of URLs.

13. The computer-readable medium of claim 10, further comprising instructions to update the hierarchical structure with a second plurality of URLs including malicious and benign URLs.

14. The computer-readable medium of claim 13, wherein the instructions to update the hierarchical structure with the second plurality of URLs comprise instructions to update nodes at each depth of the hierarchical structure according to third values for feature sets at each depth for URLs in the second plurality of URLs.

15. The computer-readable medium of claim 10, wherein features for the first feature set of the plurality of feature sets at the first depth in the hierarchical structure comprise alphabet statistics of a URL component, top-level domain, length of a URL component, wherein features for the second feature set of the plurality of feature sets at the second depth successive to the first depth in the hierarchical structure comprise gibberish text, file extensions, embedded domains, percent encodings, and e-mail addresses, wherein features for a third feature set of the plurality of feature sets at a third depth successive to the second depth in the hierarchical structure comprise keywords.

16. An apparatus comprising:
a processor; and
a machine-readable medium having instructions stored thereon that are executable by the processor to cause the apparatus to:
generate a hierarchical structure of values for feature sets from a first plurality of malicious and benign URLs, wherein each depth of the hierarchical structure corresponds to a different feature set of the feature sets and each node at a depth of the hierarchical structure indicates one or more values of the feature set for corresponding URLs from the first plurality of malicious and benign URLs, wherein a subset of nodes in the hierarchical structure corresponds to both a malicious URL and a benign URL of the first plurality of malicious and benign URLs;

identify a plurality of leaf nodes in the hierarchical structure indicating one or more values that correspond to a malicious URL;

extract a plurality of patterns from the plurality of leaf nodes in the hierarchical structure, wherein the plurality of patterns comprise patterns indicated by values of the feature sets at the plurality of leaf nodes and values of the feature sets at respective parent nodes of the plurality of leaf nodes in the hierarchical structure; and indicate the plurality of patterns for malicious URL detection.

17. The apparatus of claim 16, wherein URL features corresponding to the feature sets comprise alphabet statistics of a URL component, top-level domain, length of a URL component, gibberish text, file extensions, embedded domains, percent encodings, e-mail addresses, and keywords.

18. The apparatus of claim 16, wherein each of the feature sets comprises features of components of URLs in the first plurality of malicious and benign URLs.

19. The apparatus of claim 16, wherein the machine-readable medium further has stored thereon instructions executable by the processor to cause the apparatus to associate the hierarchical structure with a malicious campaign corresponding to at least a subset of the first plurality of malicious and benign URLs.

20. The apparatus of claim 16, wherein the machine-readable medium further has stored thereon instructions executable by the processor to cause the apparatus to update the hierarchical structure with a second plurality of malicious and benign URLs.

* * * * *